Dec. 23, 1958

R. A. PRIOR 2,866,152

THREE PHASE REGULATOR CONNECTIONS

Filed April 22, 1955

Inventor
Roger A. Prior,
by Gilbert P. Tarleton
His Attorney.

346

United States Patent Office 2,866,152
Patented Dec. 23, 1958

2,866,152

THREE PHASE REGULATOR CONNECTIONS

Roger A. Prior, Pittsfield, Mass., assignor to General Electric Company, a corporation of New York Application April 22, 1955, Serial No. 503,220

12 Claims. (Cl. 323—44)

This invention relates to the regulation of alternating current voltages, and more in particular to circuit arrangements for the regulation of three phase alternating current power supply systems.

Three phase voltages have been regulated by many different means, and the circuit connections employed for such purposes are numerous and varied. In a typical system, a three phase three wire power supply is delta connected to the primary windings of a power transformer. The secondary winding of the power transformer is delta connected, and the secondary winding voltage is regulated by a Y-connected regulator. In the case where the regulator is of the induction type, the secondary windings of the regulator are connected in series with the primary windings, and the secondary windings of the power transformer are connected to the junctions between the primary and secondary windings of the regulator. The load circuit is then connected to the other ends of the secondary regulator windings, and the other ends of the primary regulator windings are joined together.

In this type of connection, the secondary regulator winding must be rated to carry the full load current. It may also be desirable or necessary to provide a tertiary winding on the regulator to "tie-down" the neutral. The induction regulator may be of the conventional single core three phase type, or it may be a triplex induction regulator. In the former case the output voltage has a phase shift introduced by the regulator, while in the latter case there is no phase shift since a triplex induction regulator consists basically of three single phase regulators mechanically coupled together. As an alternative in this circuit arrangement, a step regulator may be used instead of an induction regulator. Regardless of the type of regulator used, however, the regulator must be rated to carry full load current.

In a second type of circuit arrangement, the primary and secondary windings of the power transformer are delta connected as before, but the secondary windings of the regulator are connected in series with the load and the primary windings of the regulator are delta connected to the power supply. In this circuit arrangement it is obvious that the secondary windings of the regulator must be rated to carry the full load current. This circuit also has the disadvantage that, regardless of the type of regulator employed the regulator introduces a phase shift in the output voltage. Although in some instances the presence of a phase shift is not important, serious difficulties may arise as a result of this condition, and costly means must be provided to prevent the phase shift.

Anothed disadvantage of the latter circuit arrangement is that it is not possible to lower the load voltage to a value less than 50 percent of the power transformer secondary winding voltage.

Although the above-described regulator systems are only a few of the many possible circuits, it may be said in general that the majority of previous circuits require the regulators to carry the full load current. While in some instances it may be feasible to regulate the voltage at the primary side of the power transformer, frequently the magnitude of the primary voltage prohibits this practice. The disadvantage of requiring the regulator to carry the full output load current is a matter of design, and it is not economically feasible to construct a regulator, especially of the induction type, capable of carrying more than a given maximum value. Although a plurality of regulators may be connected in parallel to achieve the desired result, control means are required in order to properly interconnect the regulators so that unwanted circulating current will not be introduced in the system. This latter solution is of course also quite costly.

It is therefore an object of this invention to provide an improved regulator circuit for three phase voltages.

It is also an object to provide a three phase regulator circuit employing conventional regulator components and characterized by not requiring full load current to be carried by the regulators.

Another object of this invention is to provide a three phase delta connected regulator circuit wherein negative regulation of the output voltage is not limited to 50 percent of the secondary winding voltage of the associated power transformer.

Still another object is to provide a three phase delta connected regulator circuit that does not have an inherent phase shifting characteristic.

A further object of this invention is to provide a three phase regulator circuit wherein the secondary windings of the power transformer and the secondary windings of the regulator are delta connected so that each leg of the secondary delta contains a power transformer secondary winding in series with a regulator secondary winding.

Briefly stated, in accordance with one embodiment of my invention, a three phase power supply is delta connected to the primary winding of a power transformer and also to the primary windings of a three phase regulator. The regulator may be of the step type or induction type. The secondary windings of the regulator and power transformer are delta connected so that each leg of the secondary delta is comprised of a power transformer secondary winding in series with a regulator secondary winding. In practicing my invention in its broader aspects, it will occur to those skilled in the art that many variations of this basic circuit may be made without departing from the spirit or scope of my invention.

My invention will be better understood from the following description taken in connection with the accompanying drawing, and its scope will be pointed out in the appended claims.

Figure 1:
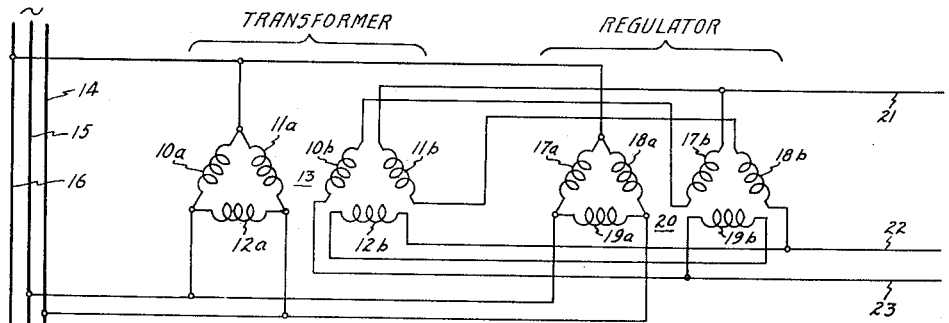
Fig. 1 is a simplified circuit diagram of a three phase regulator system and illustrating one embodiment of my invention.

Referring now to Fig. 1, the primary winding $10a$, $11a$, and $12a$ of a power transformer 13 are shown delta connected to three phase power supply lines 14, 15 and 16. The power transformer 13 is preferably a three phase transformer, although three single phase transformers may be used. Primary windings $17a$, $18a$, and $19a$ of a three phase simultaneously controlled regulator 20 are also delta connected to the three phase power supply lines 14, 15 and 16 and are in phase respectively with windings $10a$, $11a$ and 12. The secondary windings $10b$, $11b$, and $12b$ inductively coupled to primary windings $10a$, $11a$ and $12a$ respectively of power transformer 13, and the secondary windings $17b$, $18b$ and 19b inductively coupled to primary windings 17a, 18a, and 19a respectively of regulator 20 are delta connected to three phase load lines 21, 22, and 23 so that one leg of the secondary delta circuit is comprised of the series combination of secondary windings 10b and 17b, another leg of the secondary delta is comprised of the series combination of secondary windings 11b and 18b, and the remaining leg of the secondary delta is comprised of the series combination of secondary windings 12b and 19b.

The above-described circuit is particularly adapted for the application where the power transformer 13 is a step down transformer. The regulator may be a step regulator or an induction regulator. The control of the regulator is not herein illustrated since the many various possible connections are obvious to one skilled in the art and illustration thereof would unduly confuse the drawing and complicate this disclosure without materially aiding the understanding thereof.

From the previous discussion it is obvious that secondary windings of the regulator 20 carry only $1/\sqrt{3}$ times the full load current carried by each of the load lines 21, 22, and 23. Although the total required KVA rating of the regulator is not changed by employing this circuit, the reduction in current carrying capacity enables the use of standard regulators in a situation where it was previously not practical to use a single regulator. This may be more fully understood when it is considered that previous single regulator circuits required the regulator windings to carry the full load current, and also that there is a definite practical design limitation on the maximum current carrying capacity of a regulator, while the maximum voltage capacity and KVA ratings are not nearly as critical.

As previously stated, either a step regulator or an induction regulator may be employed. When a step regulator or a triplex induction regulator is used there is no phase shift of the load voltage with respect to the supply voltage, however, when a conventional single core induction regulator is used there is a phase shift.

As a further advantage, the above-described circuit has no limitation on the minimum load voltage obtainable by regulation as is the case with many previous delta connected regulator circuits, since the load lines are connected directly to the corners of the secondary delta and the voltage appearing between the corners is the sum of the secondary winding voltages of the power transformer and regulator.

Figure 2:
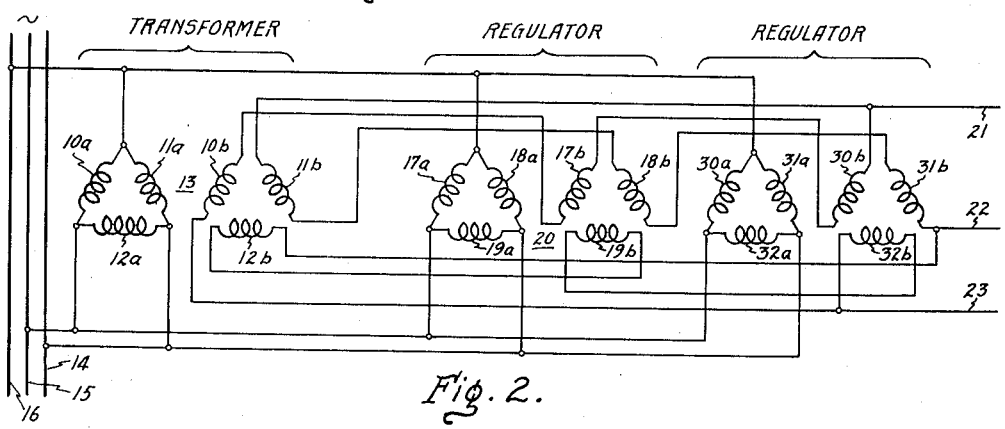
Fig. 2 is a circuit diagram of a variation of the three phase regulator system of Fig. 1.

A modification of the circuit of Fig. 1 as illustrated in Fig. 2 has primary windings 30a, 31a, and 32a of a second regulator connected in parallel respectively with primary windings 17a, 18a, and 19a of the regulator 20 of Fig. 1. In this circuit, the secondary windings 30b, 31b, and 32b inductively coupled to primary windings 30a, 31a and 32a of the second regulator are connected in series with the legs of the secondary delta, so that one leg of the secondary delta comprises a series combination of secondary windings 10b, 17b, and 30b, another leg of the secondary delta comprises a series combination of secondary windings 11b, 18b and 31b, and the remaining leg of the secondary delta comprises secondary windings 12b, 19b, and 32b. In this circuit an increased percent of regulation may be possible with standard regulators. No difficulty arises from the parallel connection between the regulator primary windings since the regulator secondary windings are in series and therefore must carry identical currents in each leg of the secondary delta, and thereby force equal division of load between the two regulators.

Figure 3:
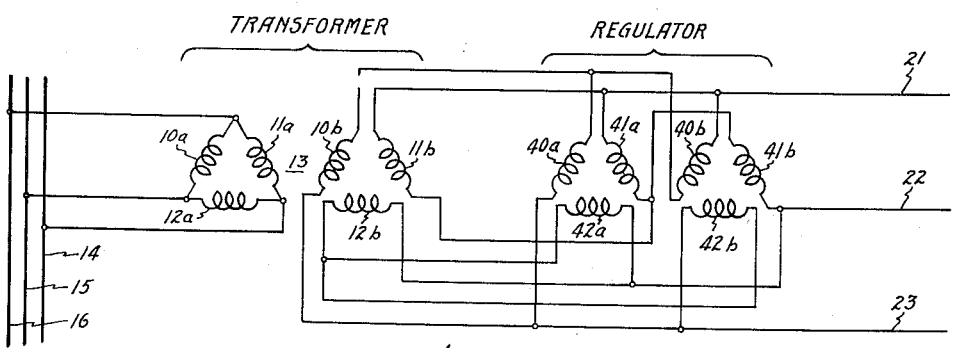
Fig. 3 is a circuit diagram of another variation to the three phase regulator system of Fig. 1.

Another modification of the circuit of Fig. 1 is illustrated in Fig. 3 wherein the primary windings 10a, 11a, and 12a of power transformer 13 are delta connected to supply leads 14, 15 and 16 as in the circuit of Fig. 1. In this modification, the secondary windings 10b, 11b, and 12b of the power transformer are connected in parallel respectively with primary windings 40a, 41a and 42a of a three phase regulator, and the secondary windings 40b, 41b, and 42b inductively coupled to the primary windings 40a, 41a, and 42a respectively of the regulator are connected in series with the parallel combinations in each leg of the secondary delta. Thus one leg of the secondary delta comprises a secondary winding 40b in series with a parallel combination of secondary winding 10b and primary winding 40a, another leg of the secondary delta comprises secondary winding 41b in series with a parallel combination of secondary winding 11b and primary winding 41a, and the remaining leg of the secondary delta comprises secondary winding 42b in series with a parallel combination of secondary winding 11b and primary winding 41a, and the remaining leg of the secondary delta comprises secondary winding 42b in series with a parallel combination of secondary winding 12b and primary winding 42a. This modification is useful in the case where the three phase supply voltage is too high to employ standard regulator primary windings in the supply line side of the regulator system, but the transformer secondary winding voltage is a standard regulator primary voltage. A large range of regulation is not necessary in many cases with this connection, but as in the previous case, any reduction is possible.

From the preceding disclosure, it is seen that the circuit of my invention reduces the rated secondary current of a three phase regulator by the square root of three as compared to other three phase regulator connections. Although the KVA capacity is not reduced, the lower current results in a simpler and more easily built regulator. The circuit provides for a substantial reduction in cross section of interconnections between the regulator and the transformer. The connection permits a delta connection which can be used on three phase, three wire or three phase four wire systems, and no tertiary winding is necessary to establish a neutral. The circuit introduces no substantial phase shift in the system in which it is connected unless the regulator itself has an inherent phase shift. In addition, the connection permits lowering of the load voltage to values less than 50 percent of the power transformer secondary winding voltage.

Although the invention has been specifically disclosed in relation to a three phase power system, it may advantageously be employed on any polyphase system having at least three phases.

It will be understood, of course, that while the forms of my invention herein shown and described constitute preferred embodiments of the invention, it is not intended herein to illustrate all of the possible equivalent forms or ramifications thereof. It will also be understood that the words used are words of description rather than of limitation, and that various changes may be made, such as, for example, Y-connecting the primary windings of the regulator or power transformer or both of Fig. 1, without departing from the spirit or scope of my invention.

What I claim as new and desire to secure by Letters Patent of the United States is:

1. In a polyphase voltage regulating system, having at least three phases, a voltage regulator having at least three primary and at least three secondary windings, transformer means having at least three primary and at least three secondary windings, and means interconnecting said secondary windings to form a secondary delta circuit, each leg of said delta circuit being comprised of one of said transformer secondary windings in series with one of said regulator secondary windings.

2. In a three phase voltage regulating system, voltage regulator means having three primary and three secondary windings, transformer means having three primary and three secondary windings, and means interconnecting said secondary windings to form a secondary delta circuit, each leg of said delta circuit being comprised of one of said transformer secondary windings in series with one of said regulator secondary windings, load circuit means connected to said delta circuit, and three phase means for energizing said primary windings.

3. In a three phase voltage regulating system, voltage regulator means having three primary and three secondary windings, transformer means having three primary and three secondary windings, and means interconnecting said secondary windings to form a secondary delta circuit, each leg of said delta circuit being comprised of one of said transformer secondary windings in series with one of said regulator secondary windings, load circuit means connected to said delta circuit, said transformer primary windings being delta connected to a source of three phase voltage, and three phase means energizing said regulator primary windings.

4. In a three phase voltage regulating system, at least one voltage regulator means having three primary and three secondary windings, said primary regulator windings being delta connected to a source of three phase voltage, transformer means having three primary and three secondary windings, said transformer primary windings being delta connected to said source of voltage, means interconnecting said secondary windings to form a secondary delta connected circuit, each leg of said delta circuit comprising one of said transformer secondary windings in series with one secondary winding of each of said regulators, and a load circuit connected to said delta circuit.

5. In a three phase voltage regulating system, voltage regulator means having three primary and three secondary windings, said regulator primary windings being delta connected to a source of three phase voltage, transformer means having three primary and three secondary windings, said transformer primary windings being delta connected to said source of voltage, means interconnecting said secondary windings to form a secondary delta circuit, each leg of said delta circuit being comprised of one of said transformer secondary windings in series with one of said regulator secondary windings, and a load circuit connected to said delta circuit.

6. In a three phase voltage regulating system, voltage regulator means having three primary and three secondary windings, transformer means having three primary and three secondary windings, said transformer primary windings being connected to a source of three phase voltage, means interconnecting said secondary windings and said regulator primary windings to form a secondary delta circuit, each leg of said delta circuit being comprised of a regulator secondary winding in series with a parallel combination of a transformer secondary winding and a regulator primary winding, and a load circuit connected to said delta circuit.

7. The system of claim 6 wherein said transformer primary windings are delta connected to said source of three phase voltage.

8. In a three phase voltage regulating system, voltage regulator means having first, second and third regulator primary windings inductively coupled respectively to first, second and third regulator secondary windings, transformer means having first, second and third transformer primary windings inductively coupled respectively to first, second and third transformer secondary windings, means interconnecting said secondary windings to form a secondary delta circuit having first, second and third legs, said first leg being comprised of said first transformer secondary winding in series with said first regulator secondary winding, said second leg being comprised of said second transformer secondary winding in series with said second regulator secondary winding, said third leg being comprised of said third transformer secondary winding in series with said third regulator secondary winding, three phase means energizing said primary windings, said first, second and third transformer primary windings being energized in phase respectively with said first, second and third regulator primary windings, and a load circuit connected to said delta circuit.

9. In a three phase voltage regulating system, voltage regulator having first, second and third regulator primary windings inductively coupled respectively to first, second and third regulator secondary windings, said regulator primary windings being delta connected to a source of three phase voltage, transformer means having first, second and third transformer primary windings inductively coupled respectively to first, second, and third primary transformer windings, said first, second, and third transformer windings being delta connected to said source of voltage in phase respectively to said first, second, and third regulator primary windings, means interconnecting said secondary windings to form a secondary delta circuit having a first, second and third legs, said first leg being comprised of said first transformer secondary winding in series with said first regulator secondary winding, said second leg being comprised of said second transformer secondary winding in series with said second regulator secondary winding, said third leg being comprised of said third transformer secondary winding in series with said third regulator secondary winding, and a load circuit connected to said delta circuit.

10. The system of claim 9 wherein said regulators are triplex induction voltage regulators.

11. In a three phase voltage regulating system, voltage regulator means having first, second and third regulator primary windings inductively coupled respectively to first, second and third regulator secondary windings, transformer means having first, second and third transformer primary windings inductively coupled respectively to first, second and third transformer secondary windings, means interconnecting said secondary windings and said regulator primary windings to form a secondary delta circuit having first, second, and third legs, said first leg being comprised of said first regulator secondary winding in series with a parallel combination of said first transformer secondary winding and said first regulator primary winding, said second leg being comprised of said second regulator secondary winding in series with a parallel combination of said second transformer secondary winding and said second regulator primary winding, said third leg being comprised of said third regulator secondary winding in series with a parallel combination of said third transformer secondary winding and said third regulator primary winding, said transformer primary windings being connected to a source of three phase voltage, and a load circuit connected to said delta circuit.

12. The system of claim 11 wherein said transformer primary windings are delta connected to said source of three phase voltage.

References Cited in the file of this patent

UNITED STATES PATENTS

| | | |
|---|---|---|
| 1,551,292 | Evans | Aug. 25, 1925 |
| 2,481,786 | Schwarz | Sept. 13, 1949 |